March 29, 1927.
J. H. MEYER
STORAGE BATTERY PLATE SEPARATOR
Original Filed Aug. 2, 1924
1,622,961
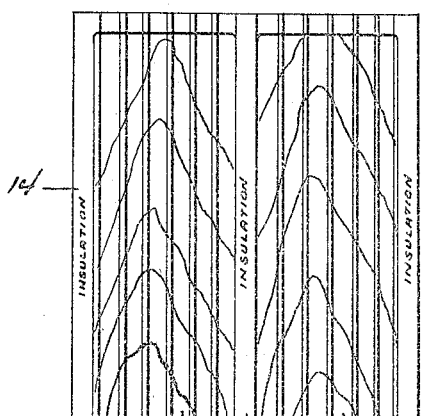
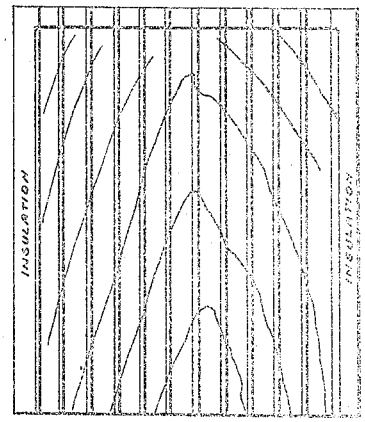
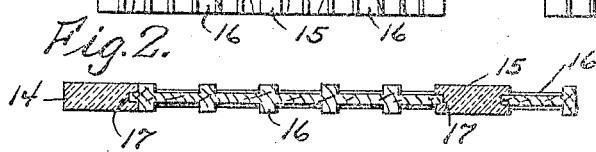

Patented Mar. 29, 1927.

1,622,961

UNITED STATES PATENT OFFICE.

JOHN H. MEYER, OF UNADILLA, NEBRASKA.

STORAGE-BATTERY-PLATE SEPARATOR.

Application filed August 2, 1924, Serial No. 729,777. Renewed November 10, 1926.

This invention relates to storage battery construction, particularly to separators, and has for its object the provision of a novel plate separator so constructed and arranged as to permit the necessary circulation of electrolyte while positively preventing short circuiting of the plates at the corners or at any other point throughout their areas.

A more specific object is the provision of a separator including a marginal or frame portion of hard rubber within which may or which may not be mounted a wood separator, depending upon the preference of the manufacturer, the marginal hard rubber portion positively preventing buckling or warping of the plates from any cause.

With the above and other objects and advantages in view, the invention consists in the details of construction and arrangement to be hereinafter more fully described and claimed, and illustrated in the accompanying drawings, in which:—

Figure 1 is a detail elevation of one form of separator.

Figure 2 is a cross-section therethrough, and

Figure 3 is an elevation of a modified form of separator.

Referring to the drawings in detail, and especially Figures 1 and 2 each separator may consist of a frame 14 of hard rubber including a top portion, sides and an intermediate strip 15. Within the two portions of the frame defined by this medial strip 15 are mounted wooden separator plates 16 of conventional construction. It should be noted that the edges of the openings within the frame are grooved at 17 for the reception of the edges of the wooden separator plates so that they will be properly held in position.

If preferred, the separators might be constructed as shown in Figure 3 in which the construction is exactly the same except that the intermediate strip 15 above described, is omitted.

While I have shown and described the preferred form of the invention it is to be understood that I reserve the right to make such changes in the construction and arrangement as will not depart from the spirit of the invention or the scope of the subjoined claims.

Having described the invention, I claim:—

1. A storage battery plate separator comprising a rectangular frame of insulating material open at one end, and having its confronting edges grooved, and a wooden filler of sheet or plate-like formation having its outer edges grooved and conformingly and slidably engaged within the grooves in said frame.

2. A storage battery plate separator comprising a rectangular frame of insulating material open at one end, and having its confronting edges grooved, and a wooden filler of sheet or plate-like formation having its outer edges grooved and conformingly and slidably engaged within the grooves in said frame, the opposite side of the filler and the opposite side of the frame member at the closed end being formed with alternating grooves and ridges.

3. In a storage battery plate separator, a rectangular frame of hard rubber closed at one end and open at the opposite end, the frame including vertical side members and a central intermediate member, the latter defining two similar open portions, the confronting edges of each open portion being formed with grooves, and wooden plate fillers fitting within the open portions of the frame member, and having their outer edges ridged for conforming and slidable engagement within the grooves.

In testimony whereof I affix my signature.

JOHN H. MEYER.